Figure 1:
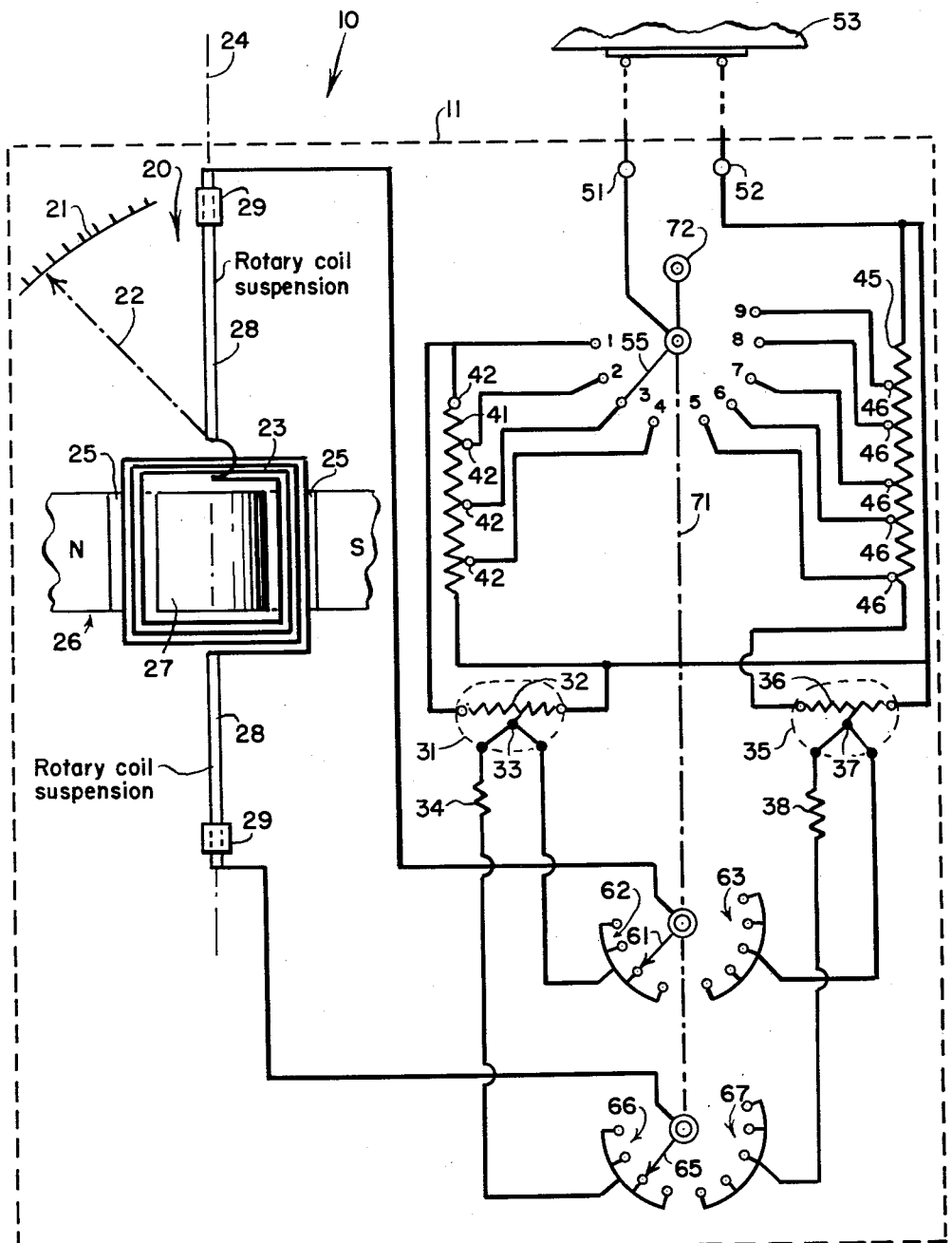

Dec. 5, 1961     E. H. GREIBACH     3,012,196
MULTI-RANGE ALTERNATING CURRENT MEASURING DEVICES
Filed Jan. 13, 1959     2 Sheets-Sheet 1

INVENTOR.
E.H.Greibach

ATTORNEYS

United States Patent Office 3,012,196
Patented Dec. 5, 1961

3,012,196
MULTI-RANGE ALTERNATING CURRENT
MEASURING DEVICES
Emil H. Greibach, 315 North Ave., New Rochelle, N.Y.
Filed Jan. 13, 1959, Ser. No. 786,524
2 Claims. (Cl. 324—115)

This invention relates to electric alternating current measuring devices, and more particularly to electrothermic alternating current measuring devices or meters having an electrothermic member which is heated by the alternating current to be measured and develops a corresponding direct-current voltage which is supplied to a direct-current meter movement the scale of which is calibrated to indicate the magnitude of the measured alternating current.

It has long been common practice to design such electrothermic meters for operation at full scale range with different current sensitivities, such meters being at times called "multi-meters," by which name they will be designated herein. In such electrothermic multi-meters, a resistance shunt is connected across the heater element of the thermocouple member so as to make it possible to use the same meter unit at full-scale deflection with different sensitivity settings for measuring alternating currents of different ranges of magnitude or different current ranges. However, electrothermic multi-meter units of this type as heretofore available, in which all operating elements are combined in the same meter unit, have been limited to a full-scale current reading in the highest sensitivity current range which is at most 500 times lower than the full-scale current reading in the lower sensitivity range of the meter, or to a ratio of full-scale current range of 1 to 500. As an example, a typical available highest-current-range electrothermic multi-meter unit of this type having a full scale high-sensitivity range of 2 milliamperes, was limited to a full scale lowest sensitivity range of a maximum of only 1000 milliamperes. To meet the need for performing with the same meter measurements of alternating currents with a greater ratio of full-scale current ranges, for instance with the higher-sensitivity, full-scale current range being 1/10,000 of the lowest full-scale sensitivity range, there have been provided multi-range thermocouple units for use with a separate direct-current meter unit. Such multi-range thermocouple units usually have a plurality of different thermocouple members one for each of the different ranges of current to be measured, and a plurality of different external circuit terminals through which the heater element of each different thermocouple member may be selectively connected to the measured external circuit, a pair of exposed direct-current terminals to which a separate meter is connected, and a sensitivity switch for selectively connecting the exposed direct-current terminals to the thermocouple of the corresponding selected thermocouple member. Such multi-range alternating current measuring arrangements have been cumbersome in use because they required change of the connection of the external circuit to a different external circuit terminal of the multi-range thermocouple unit in addition to switching the direct-current terminals of the separate thermocouple unit to the respective thermocouple member. In addition, because of the need for making two changes, namely changing the connection of the external circuit to another external circuit terminal of the separate thermocouple unit and changing the connection of the direct-current terminals to the different selected thermocouple member, inadvertent mistakes occur which cause thermocouple burn-outs when changing from a higher-current range to a lower-current range thermocouple member.

Among the objects of the invention is an electrothermic alternating-current meter unit combining and carrying in the same meter unit the direct-current meter movement and all other elements required for performing full-scale measurements at different current ranges, with only two external terminals to the external circuits to be measured, and only one movable control structure movable to different current range settings, which make it possible to perform with the same meter unit alternating-current measurements over a current range at least ten times greater than the maximum current range that could be measured with heretofore-available electrothermic meter units of this type.

Figure 2:
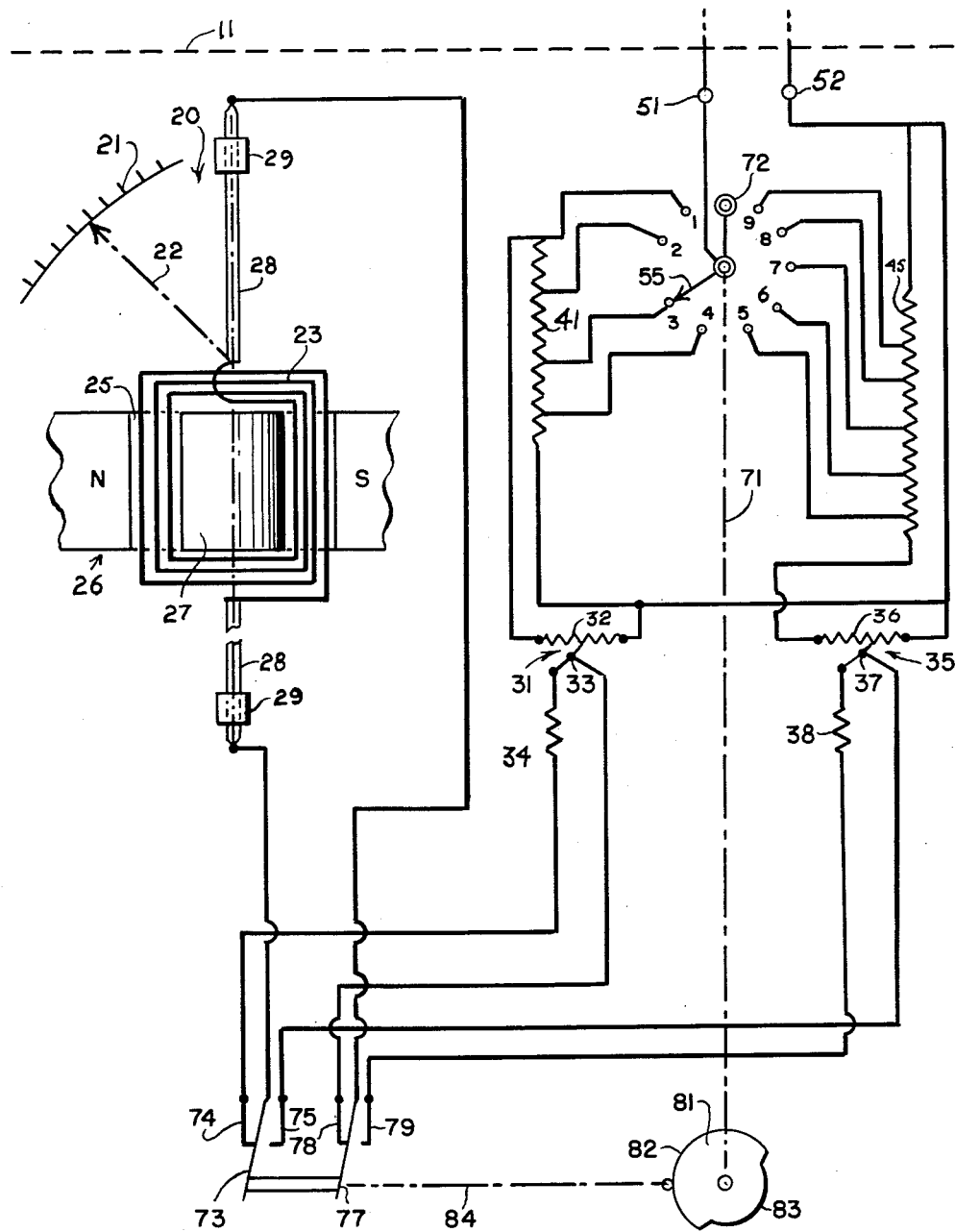

The foregoing and other objects of the invention will be best understood from the following description of exemplifications thereof, reference being had to the accompanying drawings, wherein:

FIG. 1 is a diagrammatic view of one form of an alternating-current electrothermic meter unit exemplifying the invention; and FIG. 2 is a similar diagrammatic view of another form of such electrothermic meter unit of the invention.

FIG. 1 shows diagrammatically one form of an electrothermic alternating current meter unit 10 exemplifying the invention. All elements of the meter unit 10 are mounted and carried on a support structure or meter casing structure indicated by dash-line 11. The meter support or casing 11 may have any shape, and may be of the types used for mounting and housing known conventional direct-current or alternating-current meters. For instance, the casing 11 may be of the type described in connection with FIGS. 1–3, or 17–20, or 21, 22, of U.S. Patent 2,562,183. Within the meter casing 11 or meter 10, is operatively mounted and carried, a direct-current meter movement 20 having an exposed scale 21 for indicating thereon with a meter point 22 the direct current passing through actuating elements of meter movement 20. Any type of direct-current meter movement may be used, and the invention will be described, as an example, in connection with a direct-current meter movement of the D'Arsonval type having a coil 23 with a suitable number of coil turns arranged to rotate around a coil axis indicated by dash-line 24. In such meter the two operative coil sides are arranged to move in two arcuate air-gaps 25 of a ferromagnetic field structure 26 which produces a unidirectional magnetic field in the two air-gaps 25. The field structure 26 is of conventional type, and has a field-inducing permanent ferromagnetic core portion with two opposite poles, indicated by north and south pole symbols "N," "S," and an intermediate cylindrical core element 27 with which it forms a substantially closed ferromagnetic circuit separated by the two arcuate air-gaps 25 in which the two operative coil sides of coil 23 are rotatably swinging or deflecting.

The meter indicator or pointer 22 which is carried by the coil 23, may be either a light pointer or a mechanical pointer which swings with or is deflected by the coil so as to indicate on scale 21 the magnitude of the direct current flowing through meter coil 23. As is known, direct-current meters operate on the same principle as direct-current voltmeters, which involve merely measurement of the voltage drop across a known resistance or impedance. The meter coil 23 may be mounted for deflecting or swinging rotary movement on coil pivots, as in conventional direct-current meters, and the connections to the coil may be provided by conventional spiral restoring springs which return the coil 23 to a predetermined initial or zero position. The direct-current movement 20 of FIG. 1 is indicated as having the coil 23 pivotally carried for rotatably swinging around coil axis 24 by two opposite bifilary suspension members 28 connected to the opposite transverse sides of meter coil 23 and extending to two opposite supporting anchor elements 29 which are maintained fixed on suitable supports of the meter casing 11, for instance in the manner disclosed in U.S. Patent 2,562,183, and U.S. application Serial No. 412,462, filed February 25, 1954, now Patent No. 2,882,497.

The restoring forces of the two bifilary suspension members 28 control the movement of the meter coil 23 and its pointer 22, and serve to return it to the initial or zero position on the scale 21. In addition, the two bifilary suspension members 28 provide opposite-polarity terminal connections to meter coil 23. To measure alternating current with the direct-current movement 20, the meter support casing 11 or the meter unit 10 has also mounted thereon, electrothermic means responsive to flow of the alternating current that is to be measured for producing a corresponding direct-current voltage which supplies to the meter coil 23 a direct current corresponding in magnitude to the alternating current supplied to the electrothermic means for producing with pointer 22 a corresponding calibrated indication of the magnitude of the measured alternating current on scale 21.

In accordance with the invention, a direct-current meter movement or meter unit 20 of the type described above, is combined with a series of two or more electrothermic members each for a different sub-range of alternating currents to be measured with a full coil deflection for each current sub-range, for making it possible to measure with the same meter unit alternating currents with a full-scale, high-sensitivity current range which is at least 5000 times lower than its full-scale low-sensitivity current range at a series of different sensitivity settings determined by movement of a single mechanical sensitivity setting means, without disturbing or changing the connections of the meter unit to the external circuit to be measured.

In the exemplification of the invention shown in FIG. 1, the meter movement 20 is designed for cooperation with a plurality of electrothermic members 31, 35, and they may be of any of the known types having a heater element which when traversed by an alternating current to be measured, develops on a electrothermic or thermocouple element thereof an electric voltage output corresponding to the magnitude of the alternating current passing through the heater element thereof. The electrothermic members 31, 35 may have any of the known conventional thermocouple elements that are used in similar electrothermic alternating-current meters, such as a thermocouple unit consisting of a welded junction of two dissimilar metals which when heated by an electric resistance heater element, develops at the junction an electric voltage corresponding to the root-mean-square value of the alternating current passing through the associated heater element, with the heater and thermocouple enclosed in an evacuated glass bulb. Although only two electrothermic members are shown in FIG. 1, a meter unit 10 of the invention may operate in the manner described below with a larger number of similar thermoelectric members for further increasing the over-all range of its sensitivity settings, for instance from a high-sensitivity, full-scale current range of 1 milliampere to a low-sensitivity, full-scale current range of 30 amperes, or a current range ratio of 1 to 30,000 and higher, if required.

Electrothermic members 31 and 35 have each a resistance heater filament 32, 36, respectively, to an intermediate part of which is joined a thermocouple junction 33, 37, respectively. Each thermocouple junction 33, 37 is formed in a conventional way of two crossing wires of dissimilar metal. Assuming that the electrothermic member 31 is designed for use in making alternating current measurements with a series of different high-sensitivity settings, and the electrothermic member 35 is designed for making alternating current measurements with a series of different low-sensitivity settings, the heater element 32 of the high-sensitivity electrothermic member 31 will have relatively high resistance, and the heater element 36 of the low-sensitivity electrothermic member 35 will have relatively low resistance, so as to require a minimum of alternating current for developing across their respective thermocouple junctions 33, 37, voltages corresponding to the alternating current passing through the respective heater elements 32, 36. As an example, with a meter of the invention designed to measure alternating current with a series of different sensitivity settings at full scale deflection with a full-scale current-range ratio at 1 to 10,000 of different sensitivity settings, the high-sensitivity electrothermic member 31 may have a heater element 32 with a resistance of 1300 ohms, and the low-sensitivity electrothermic member 35 may have a heater element 36 with a resistance of 1.1 ohm.

To make it possible to measure with each of the different electrothermic members 31, 35 at full scale deflection of the same meter movement 20, alternating currents over the wide range of current magnitudes with which the meter of the invention will operate, a different shunt resistance 41, 45 is connected in shunt across each of the different heater elements 32, 36 of the different, respective electrothermic members 31, 35. The different shunt resistances 41, 45 differ in their resistance in a manner correlated to the resistances of the different heater elements 32, 36 of the different electrothermic members 31, 35, respectively, to which they are connected. Each of the shunt resistances 41, 45 has a plurality of serially connected resistance elements with a plurality of different taps or resistance terminals 42, 46, along the different serially connected resistance elements of each shunt resistance 41, 45, respectively.

The meter casing or meter unit 10 has mounted thereon or carries as an essential part thereof, two meter terminals 51, 52 of opposite polarity to which leads of an external alternating current device 53 are connected for measuring alternating current in a circuit of such exterior device 53. For measuring alternating current of different magnitudes with full-scale deflection of the meter movement 20 at a series of different sensitivity ranges, there are mounted or carried on the meter casing or meter unit 10, sensitivity setting means shown as sensitivity switch means 55 together with coil switch means shown as two coil switches 61, 65. The sensitivity switch means 55 may be of any known conventional type, and it is shown as consisting of a movable switch arm which may be moved, as by rotation around a central pivot, to make connections with a series of different switch contacts indicated by numerals 1–9, corresponding to the different sensitivities with which the alternating currents of each current range are to be measured. The coil switches 61, 65 of the coil switch means likewise may be of any known type, and each is shown as consisting of a movable switch arm which may be moved, as by rotation around a central pivot, to make connections with a series of different switch contacts 62, 63 and 66, 67, respectively. In the form shown in FIG. 1, the series of switch contacts 62, 66 of coil switches 61, 65, respectively, correspond to contact positions 1, 2, 3, 4, of sensitivity switch 55, and the series of switch contacts 63, 67 of the two coil switches 61, 65, respectively, correspond to switch contacts 5–9 of sensitivity switch 55.

In accordance with the invention, the sensitivity setting means, such as sensitivity switch means 55 and coil switch means 61, 65, are interlinked with each other for conjoint actuation by a common actuating member or means to different settings of a group of different high-sensitivity settings, and at least one further group of different low-sensitivity settings, so that in each of the different settings of the group of high-sensitivity settings, the two external meter terminals, such as external meter terminals 51, 52, are connected to the heater element 32 of electrothermic member 31 and to a different resistance terminal 42 of its shunt resistance 41, for performing alternating current measurements at each different setting of the group of different high-sensitivity settings corresponding to switch contacts 1, 2, 3, 4; and so that in each of the different settings of the group of low-sensitivity settings, the two external meter terminals 51, 52 are connected to heater element 36 of the other electrothermic member 35 and to a different resistance terminal 46 of its shunt resistance 45 for performing alternating current measurements at each different setting of the group of different low-sensitivity settings, such as corresponding to switch contacts 5, 6, 7, 8, 9. The coil switch means, such as coil switches 61 and 65, are interlinked with the sensitivity setting means, such as sensitivity switch means 55, so as to connect the meter coil 23 of the direct-current meter movement 20 to the thermocouple element 33 of electrothermic member 31, in each of the groups of different high-sensitivity settings 1 to 4 of sensitivity setting switch means 55, and to connect the meter coil 23 to the thermocouple element 37 of the electrothermic member 35 in each of the groups of different low-sensitivity settings 5 to 9 of the sensitivity setting switch means 55.

A meter of the invention may be arranged for measuring alternating currents over any desired large current-magnitude range, by providing it with one or more additional electrothermic members (such as members 31, 35) with the associated multi-tap shunting resistances (such as shunt resistances 41, 45), wherein the sensitivity setting means such as switch means 55, 65, 66 are provided with additional groups of switch contacts (such as switch contacts 1 to 9) for switching the connections of the meter coil to the thermocouple of the respective additional electrothermic member, and for switching the connections of the external meter terminals 51, 52 to the corresponding resistance terminals of the respective additional shunt resistance connected to the heater element of the respective additional electrothermic members.

For securing cooperation of meter coil 23 of the direct-current meter movement 20 with either one of two electrothermic members 31, 35, in accordance with the principles of the invention, they may be connected to the sensitivity setting means comprising sensitivity switch means 55 and coil switch means 61, 65, in the manner shown in FIG. 1. The opposite end terminals of shunt resistance 41 are connected to the opposite end terminals of the heater resistance element 32 of its associated electrothermic member 31. Similarly, the opposite end terminals of the other shunt resistance 45 are connected to the opposite end terminals of the heater resistance element 36 of its associated electrothermic member 35. A series of consecutive switch contacts 1, 2, 3 and 4 of sensitivity setting switch 55 are connected to the series of consecutive different resistance terminals 42 along consecutive interconnected resistance portions of shunt resistance 41 of the heater element 32 of the electrothermic member 31. The further series of consecutive switch contacts 5, 6, 7, 8 and 9 of sensitivity setting switch 55 are connected to the series of consecutive resistance terminals 46 along consecutive interconnected resistance portions of shunt resistance 45 of the heater element 36 of the associated other electrothermic member 35.

One of the two external meter terminals 51, 52, namely meter terminal 51, is shown connected to the movable sensitivity setting switch arm 55 so that as the switch arm 55 is actuated or moved from the highest-sensitivity switch-setting contact 1 to successive lower-sensitivity switch setting contacts 2 to 9, the external meter terminal 51 will be selectively connected, first, to consecutive resistance terminals of shunt resistance 41 of the first electrothermic member 31 at the successively lower-sensitivity switch-contact positions 1, 2, 3, 4, and thereafter to consecutive resistance terminals of the shunt resistance 45 of the other electrothermic member 35 at further successively lower-sensitivity switch-contact positions 5, 6, 7, 8 and 9. The other external meter terminal 52 is connected to the opposite end terminal of each of the different shunt resistances 41, 45, which is remote from their respective resistance end terminals that are connected to sensitivity switch contacts 1 and 5, respectively. The movable switch arms of the two coil switch means 61, 65 are connected to the two opposite ends of meter coil 23.

The high-sensitivity group of coil switch contacts 62, 66 of the two coil switch means 61, 65, respectively, are connected to the opposite terminals of thermocouple 33 of electrothermic member 31. The low-sensitivity group of coil switch contacts 63, 67 of the respective two coil switch arms 61, 65 are connected to the opposite terminals of thermocouple 37 of the other electrothermic member 35. With this arrangement, conjoint movement of the two switch arms 61, 65 to their respective switch contacts 62, 66, connects thermocouple 33 of higher-sensitivity electrothermic member 31 to the meter coil 23 for passing therethrough direct current corresponding to the direct-current voltage generated by associated thermocouple 33. Further conjoint movement of the two switch arms 61, 65 to their further respective switch contacts 63, 67, respectively, connects instead, the thermocouple member 37 of the other lower-sensitivity electrothermic member 35 to the meter coil 23 for passing therethrough direct current corresponding to the direct-current voltage generated by associated thermocouple 37. The circuit connections of each of the two thermocouples 33, 37 of the different electrothermic members 31, 35 include an adjusting resistance 34, 38, respectively, for adjusting the current flowing from the respective thermocouples to the meter coil 23 to the required proper value.

The coil switch means 61 and 65 may be of any known type and as indicated in FIG. 1, switch contacts 62 and 63 of coil switch 61 and switch contacts 66 and 67 of coil switch 65, may form series of separate metallic switch contacts corresponding to the series of switch contacts 1, 2, 3 and 4, and switch contacts 5, 6, 7, 8 and 9, respectively, of the sensitivity switch 55, so that when coil switch arms 61, 65 are moved conjointly with the sensitivity switch arm 55, as by a common coupling connection such as a shaft indicated by dash-dot line 71, they will cause the meter coil 23 to be automatically connected to thermocouple 33 of electrothermic member 31 of shunt resistance 41 when the sensitivity switch 55 is actuated to any one of its group of high-sensitivity switch-contact settings 1, 2, 3, 4; and cause the meter coil 23 to be automatically connected instead to the thermocouple 37 of the other electrothermic member 35 when the sensitivity switch 55 is actuated to any one of its group of lower-sensitivity switch-contact settings 5, 6, 7, 8 and 9.

The several switch means 55, 61, 65 are actuated by a common actuating member, such as a knob 72 connected to the common actuating member or shaft 71 with which the three switch contacts 55, 61, 65 are rotated, making it possible to change the sensitivity setting of the alternating current meter 10 by actuation of a single sensitivity-setting member 72 for changing the sensitivity setting of the meter to a series of different sensitivity settings. This makes it possible to measure with a single direct-current coil movement, alternating currents the magnitude of which varies over a very wide range, at full scale deflection at a series of different ratios of sensitivity settings, such as with an alternating-current sensitivity setting of 1 to 10,000 milliamperes, 1 to 20,000 milliamperes, 1 to 30,000 milliamperes and any desired higher current ranges of sensitivity settings. As an example, known types of multi-deck switches having a plurality of switch arms conjointly movable along a series of respective switch contacts of the different decks, may be used in a meter of the invention for providing the sensitivity switch means 55 and the coil switch means 61, 65. In such case, the two decks of switch contacts of coil switches 61, 65 have their respective first series of switch contacts 62, 66 electrically interconnected, and their respective next series of switch contacts 63, 67 similarly electrically interconnected. Alternatively, the two consecutive series of interconnected switch contacts 62, 63 of coil switch 61 and of switch contacts 66, 67 of coil switch 65, may be provided by a continuous metallic contact member or strip.

Without thereby in any way limiting the scope of the invention, but only to enable ready practice thereof, there are given below specific data about one type of practical alternating-current meter of the present invention.

The direct-current meter movement is of the type described in my application Serial No. 412,462, filed February 25, 1954, now Patent No. 2,882,497. The rotatable meter coil gives a full-scale indication for a direct-current of 150 microamperes passing through the coil with the resistance of the coil circuit being about 8.5 ohms. It has two electrothermic members (corresponding to the electrothermic members 31, 35) of the type used in heretofore available alternating-current electrothermic meters with the thermocouple developing a direct-current voltage of 5 millivolts for rated alternating current passing through its heater element. The meter is calibrated to measure with a full-scale coil deflection of the meter movement at each of nine different sensitivity settings consisting of a series of four different full-scale sensitivity settings of 1 milliampere, 3 milliamperes, 10 milliamperes and 30 milliamperes alternating current when the sensitivity switch (such as shown at 55 in FIG. 1) is in the different sensitivity contact positions 1, 2, 3, 4, respectively; and a further series of five different full-scale sensitivity settings of 100 milliamperes, 300 milliamperes, 1000 milliamperes, 3000 milliamperes and 10,000 milliamperes alternating current when the sensitivity switch 55 is in the different sensitivity contact positions 5, 6, 7, 8 and 9, respectively. The heater element 32 of the electrothermic member 31, which operates in the higher-sensitivity switch-contact positions 1, 2, 3 and 4, has a resistance of 1300 ohms. The heater element 36 of the other electrothermic member 35, which operates in the lower-sensitivity switch-contact positions 5, 6, 7, 8 and 9, has a resistance of 1.1 ohms.

FIG. 2 shows a modified form of alternating-current meter exemplifying the invention. The meter of FIG. 2 is identical with that of FIG. 1, except for the modification described hereinafter. Instead of using rotary coil switches 61, 65 of FIG. 1, the meter of FIG. 2 has two double-throw switches 73, 77, each cooperating with two associated contacts 74, 75 and 78, 79, respectively. In their position shown in FIG. 2, the two coil switch arms 73, 77 make engagement with their respective switch contacts 74, 78 for connecting the meter coil 23 to the thermocouple 33 of electrothermic member 31. From the position shown, the two switch arms 73, 77 may be actuated or moved to the opposite switch position in which they make contact with their respective opposite switch contacts 75, 79 for connecting the meter coil 23 instead to the thermocouple 37 of electrothermic member 35. The two coil switch arms 73, 77 are arranged to be operated in response to the operation of the sensitivity setting means consisting of sensitivity switch 55 as it is being actuated or moved to a series of its different sensitivity settings corresponding to its series of switch contacts 1 to 9. This may be done, for instance, by providing the shaft 71 of sensitivity setting switch 55 with a cam arranged so as to bring and to keep the two coil switch arms 73, 77 in the position shown when the sensitivity switch arm 55 is in any one of the group of high-sensitivity switch-contact settings 1–4, and to bring and keep the two coil switch arms 73, 77 in the opposite switch-contact position when the sensitivity switch arm 55 is brought to any one of the group of low-sensitivity switch-contact settings 5, 6, 7, 8 and 9.

In the form shown, the coil switch arms 73, 77 may be suitably biased, as by spring-bias, so that when released they will return to a released position in which they make contact with their respective contact members 75, 79. The sensitivity switch arm 55 may be combined with a cam 81 carried, for instance, on the rotary shaft 72 of switch arm 55 for moving with it. The switch cam 81 may have an outer cam surface 82 and an inward cam surface 83 which are engaged by a switch follower member 84 suitably connected to the two biased switch arms 73, 77 so that when the cam follower 84 is released to and engages the inward cam surface 83, the two coil switches 73, 77 are released by their bias restraint into contact engagement with their respective contacts 75, 79 and to cause the two switch contacts 73, 77 to be flexed from their released position into engagement with their respective switch contacts 74, 78, as shown, when the switch cam follower 84 comes into engagement with the outer cam surface 82 of switch cam 81. The cam 81 is so combined with sensitivity switch arm 55 that when the sensitivity setting switch arm is in any one of its group of high-sensitivity switch-contact settings 1, 2, 3, 4, the outer cam surface 82 of its switch cam 81 brings and maintains the two coil switch arms 73, 77 in the contact positions shown, wherein the thermocouple 33 of the high-sensitivity electrothermic member 31 is connected to the meter coil 23, and that when the sensitivity switch arm 55 is in any one of its low-sensitivity switch-contact settings 5, 6, 7, 8, 9, the inward cam surface 83 releases and causes the two coil switch arms 73, 77 to be brought by their bias restraint into contact engagement with the opposite respective switch contacts 75, 79 and thereby maintain the thermocouple 37 of the lower-sensitivity electrothermic member 35 connected to the meter coil 23 in each of the group of different lower-sensitivity settings.

The features and principles underlying the invention described above in connection with specific exemplifications will suggest to those skilled in the art many other modifications thereof. It is accordingly desired that the appended claims be construed broadly and that they shall not be limited to the specific details described in connection with exemplifications thereof.

I claim:

1. In an alternating current measuring device which is movable as a self-supporting unit and comprises a meter structure, a meter coil movable over a deflection range for producing a coil deflection corresponding to direct electric current through the coil, two meter terminals only for connecting thereto each external measured circuit and at least two electrothermic structures each having a heater element of different current-carrying capacity for passing measured alternating current and an electrothermic element heated by said heater element for supplying to said coil a direct current corresponding to the magnitude of the alternating current passing through the respective heater element, a first of said electrothermic structures being of relatively higher measuring sensitivity than the second electrothermic structure, a first shunt resistance connected in shunt to the heater element of said first electrothermic structure and a second shunt resistance connected in shunt to the heater element of said second electrothermic structure, each of said shunt resistances having at least two serially connected resistance elements with at least one resistance terminal connected between the serially connected resistance elements and at least one additional resistance terminal connected to another portion of the respective shunt resistance, a sensiitvity switch element selectively settable in at least two different high-sensitiity settings and in at least two different low-sensitivity settings and operative to connect said two meter terminals to different resistance terminals of said first shunt resistance in each of said different high-sensitivity settings, respectively, and to connect said two meter terminals to different resistance terminals of said second shunt resistance in each of said different low-sensitivity settings, respectively, and a coil switch element selectively settable in at least two different coil switch settings for connecting said coil to the electrothermic element of said first electrothermic structure in one of its switch settings, and for connecting said coil to the electrothermic element of said second electrothermic structure in the other of its switch settings, said meter structure carrying thereon said two meter terminals, said electrothermic strucures, said shunt resistances, and each of said switch means, a common actuating member movably carried by said meter structure and interlinked with said sensitivity switch element and said coil switch element for causing movement of said actuating member to conjointly actuate said sensitivity switch element and said coil switch element to their respective different settings and operative to cause said coil switch element to connect said coil to the electrothermic element of said first electrothermic structure when said sensitivity switch element is selectively set in any one of its different high-sensitivity settings and for connecting said coil to the electrothermic element of said second electrothermic structure when said sensitivity switch element is set in any one of its different low-sensitivity settings, whereby said coil will operate with a substantially full coil deflection when said sensitivity switch element is set in each of its different high-sensitivity settings and in each of its different low-sensitivity settings.

2. In an alternating current measuring device which is movable as a self-supporting unit and comprises a meter structure, a meter coil movable over a deflection range for producing a coil deflection corresponding to direct electric current through the coil, two meter terminals only for connecting thereto each external measured circuit and at least two electrothermic structures each having a heater element of different current-carrying capacity for passing measured alternating current and an electrothermic element heated by said heater element for supplying to said coil a direct current corresponding to the magnitude of the alternating current passing through the respective heater element, a first of said electrothermic structures being of relatively higher measuring sensitivity than the second electrothermic structure, a first shunt resistance connected in shunt to the heater element of said first electrothermic structure and a second shunt resistance connected in shunt to the heater element of said second electrothermic structure, each of said shunt resistances having at least two serially connected resistance elements with at least one resistance terminal connected between the serially connected resistance elements and at least one additional resistance terminal connected to another portion of the respective shunt resistance, a sensitivity switch element selectively settable in at least two different high-sensitivity settings and in at least two different low-sensitivity settings and operative to connect said two meter terminals to different resistance terminals of said first shunt resistance in each of said different high-sensitivity settings, respectively, and to connect said two meter terminals to different resistance terminals of said second shunt resistance in each of said different low-sensitivity settings, respectively, and a coil switch element selectively settable in at least two different coil switch settings for connecting said coil to the electrothermic element of said first electrothermic structure in one of its switch settings, and for connecting said coil to the electrothermic element of said second electrothermic structure in the other of its switch settings, said meter structure carrying thereon said two meter terminals, said electrothermic strucures, said shunt resistances, and each of said switch means, and link means carried by said meter structure and inter-linking said coil switch means with said sensitivity switch element for correlating their respective different settings and for connecting said coil by said coil switch element to the electrothermic element of said first electrothermic structure when said sensitivity switch element is selectively set in each of its different high-sensitivity settings and for connecting said coil by said coil switch element to the electrothermic element of said second electrothermic structure when said sensitivity switch element is selectively set in each of its different low-sensitivity settings, whereby said coil will operate with a substantially full coil deflection when said sensitivity switch element is set in each of its different high-sensitivity settings and in each of its different low-sensitivity settings.

References Cited in the file of this patent
UNITED STATES PATENTS

| | | |
|---|---|---|
| 1,731,239 | Affel | Oct. 15, 1929 |
| 1,860,055 | Roller | May 24, 1932 |
| 2,059,594 | Massa | Nov. 3, 1936 |
| 2,805,394 | Hermach | Sept. 3, 1957 |